(12) United States Patent
Bogner et al.

(10) Patent No.: US 6,609,989 B2
(45) Date of Patent: Aug. 26, 2003

(54) BELT DRIVE OF AN INTERNAL COMBUSTION ENGINE

(75) Inventors: Michael Bogner, Eckental (DE); Rudolf Berger, Simmerath (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/014,833

(22) Filed: Dec. 11, 2001

(65) Prior Publication Data

US 2002/0086751 A1 Jul. 4, 2002

Related U.S. Application Data

(63) Continuation of application No. PCT/EP00/04152, filed on May 10, 2000.

(30) Foreign Application Priority Data

Jun. 11, 1999 (DE) .......................... 199 26 612

(51) Int. Cl.[7] .................................................. F16H 7/08
(52) U.S. Cl. ...................................... 474/134; 474/135
(58) Field of Search ................................ 474/134, 135, 474/136, 137, 133

(56) References Cited

U.S. PATENT DOCUMENTS

| 4,069,719 A | | 1/1978 | Cancilla ............... 74/242.15 B |
| 4,758,208 A | * | 7/1988 | Bartos et al. ............... 474/111 |
| 6,167,686 B1 | * | 1/2001 | Becker et al. ............... 474/109 |

FOREIGN PATENT DOCUMENTS

| DE | 39 39 821 A | 6/1991 |
|---|---|---|
| DE | 41 18 901 A | 12/1992 |
| DE | 689 01 767 | 1/1993 |
| DE | 42 43 451 A | 6/1994 |
| DE | 44 27 509 A1 | 2/1996 |
| DE | 44 47 017 C1 | 3/1996 |
| DE | 195 16 001 A1 | 11/1996 |
| DE | 196 24 311 C1 | 4/1998 |
| EP | 0 757 190 A | 2/1997 |
| FR | 2 781 008 A | 1/2000 |
| GB | 1 585 624 A | 3/1981 |
| JP | 0050126218 AA | 5/1993 |
| JP | 0050248508 AA | 9/1993 |
| JP | 0060094091 AA | 4/1994 |
| JP | 0080014342 AA | 1/1996 |
| JP | 0090144821 AA | 6/1997 |
| JP | 0100196745 AA | 7/1998 |
| JP | 0100205591 AA | 8/1998 |

* cited by examiner

*Primary Examiner*—Thomas R. Hannon
*Assistant Examiner*—Vicky A. Johnson
(74) *Attorney, Agent, or Firm*—Henry M. Feiereisen

(57) ABSTRACT

A drive belt of an internal combustion engine has a first pulley mounted on a crankshaft of the internal combustion engine, and a second pulley mounted on a shaft of a starter generator of the internal combustion engine. A belt is looped about both pulleys. A tensioner includes two tensioning arms, each of which loading a belt run of the belt and operating either as load-carrying belt run or non-load carrying belt run. Both tensioning arms are disposed to pivot about a rotation axis, with tensioning rollers mounted onto the tensioning arms and spring-biased against the belt. The tensioning arm disposed respectively upon the load-carrying belt run is urged into a stop position by a force applied by the belt.

7 Claims, 2 Drawing Sheets

BELT DRIVE OF AN INTERNAL COMBUSTION ENGINE

CROSS-REFERENCES TO RELATED APPLICATIONS

This application is a continuation of prior filed copending PCT International application no. PCT/EP00/04152, filed May 10, 2000.

This application claims the priority of German Patent Application Serial No. 199 26 612.3, filed Jun. 11, 1999, the subject matter of which is incorporated herein by reference.

BACKGROUND OF THE INVENTION

The present invention relates, in general, to a belt drive of an internal combustion engine, and more particularly to a belt drive which has incorporated a starter generator.

Starter generators assume two functions. Firstly, it allows starting of the internal combustion engine, and secondly, it generates electric power during operation of the internal combustion engine. As a consequence of the dual function of the starter generator, the load-carrying run and the non-load carrying run of the belt alternate depending on the mode of operation of the starter generator. All auxiliary units that are typically arranged in the belt drive, such as water pump or servo pump, can be supplied with power by the electric energy produced by the starter generator. It is also conceivable that only the crankshaft pulley and the belt pulley of the starter generator are arranged in the belt drive.

Belt drives of this type may also have incorporated therein a tensioner having two tensioning arms, whereby each tensioning arm is spring-biased against a belt run. German Pat. No. DE 42 43 451 describes such a tensioner for tension means such as belts or chains. This conventional tensioner is not suitable for application in a belt drive with starter generator because both tensioning arms jointly pivot about the rotation axis, without movement relative to one another during operation of the internal combustion engine. Thus, there is a risk that the overall system may severely vibrate as a result of dynamic excitation in the range of the own frequency, thereby impairing the operativeness of the tensioning system.

It would therefore be desirable and advantageous to provide an improved belt drive to obviate prior art shortcomings.

SUMMARY OF THE INVENTION

According to one aspect of the present invention, a belt drive of an internal combustion engine, includes a first pulley mounted onto the crankshaft of the internal combustion engine, a second puller mounted to a shaft of a starter generator, a belt looped about the first and second pulleys, and a tensioner having two tensioning arms, each of which loading a belt run of the belt and operating either as load-carrying belt run or non-load carrying belt run, wherein the tensioning arms are disposed to pivot about a rotation axis, and wherein tensioning rollers mounted onto the tensioning arms are spring-biased against the belt, with the tensioning arm disposed respectively upon the load-carrying belt run being urged into a stop position by a force applied by the belt.

According to another feature of the present invention, the belt may be a toothed belt or a V-ribbed belt.

The present invention resolves prior art problems by exploiting the effect that a greater resultant belt force is effective in the load-carrying run of the belt than in the non-load carrying run of the belt. A belt drive according to the present invention is so configured that the increased resultant belt force in the load-carrying belt run urges the associated tensioning arm into the stop position and held there. Thus, the tensioner roller of this tensioning arm works only as deflection roller, whereas the tensioning arm arranged at the non-load carrying belt run operates as directed.

According to another feature of the present invention, the rotation axis of each of the tensioning arms is spaced from the contact area of the tensioning roller upon the belt by a distance which is smaller than a vertical distance between this rotation axis and a tangent which touches the pulleys. When a run of the belt becomes a load-carrying belt run, this run approaches the described tangent and the effective lever arm, which generates in conjunction with the resultant belt force a torque that counteracts the tension spring, decreases. The tensioning arm is thus moved into a dead point position in which no or at best a very slight lever arm is effective for the resultant belt tensioning force. As a consequence, the resultant belt force acts only as tensile force in this tensioning arm. In other words, the rotation axis of the tensioning arm is so positioned in the belt drive that the tensioning arm is pivoted far enough by the resultant belt force so that the resultant belt force extends, at least approximately, in alignment with the tensioning arm.

A belt drive according to the present invention, may include auxiliary units or deflection rollers. Currently preferred is however the incorporation of only the starter generator.

Instead of the described dead point position of the tensioning arm, it may also be conceivable to provide a fixed stop member against which the tensioning arm arranged upon the load-carrying belt run is urged by the resultant belt force and held there. This ensures that the tensioning roller operates also in this variation in the load-carrying belt run as a quasi-rigid deflection roller.

According to another feature of the present invention, both tensioning arms pivot about a common rotation axis. In this way, a space-saving configuration of the overall arrangement is ensured. Of course, the rotation axes of the tensioning arms may also be arranged in spaced-apart relationship.

Suitably, the rotation axes about which the tensioning arms pivot may be arranged within an area that is circumscribed by the belt. The tensioning rollers, on the other hand, may be so disposed as to be arranged outside this area that is circumscribed by the belt. In this way, a tension spring may be provided between both tensioning arms for urging the tensioning arms toward one another.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
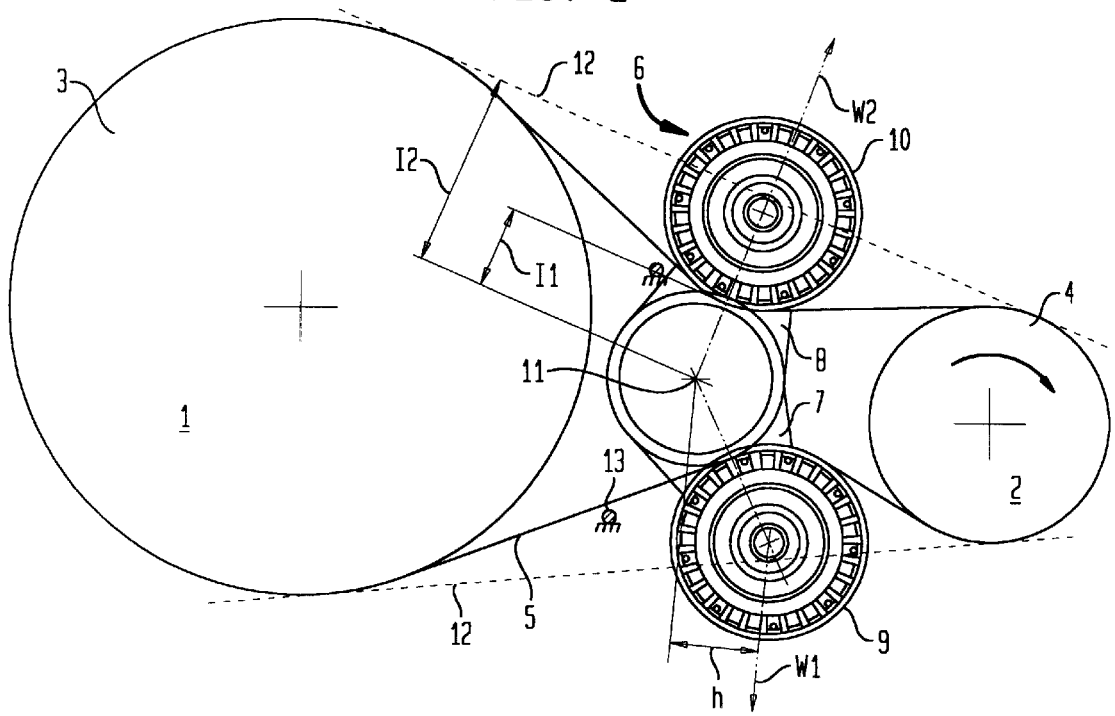
FIG. 1 is a schematic illustration of a belt drive according to the present invention, with the belt drive depicted in a starting phase of an internal combustion engine.

Throughout all the Figures, same or corresponding elements are generally indicated by same reference numerals.

Figure 3:
FIG. 3 is a fragmentary sectional view of a V-ribbed belt for use in the belt drive of FIG. 1.
Figure 4:
FIG. 4 is a fragmentary sectional view of a toothed belt for use in the belt drive of FIG. 1.

Turning now to the drawing, and in particular to FIG. 1, there is shown a schematic illustration of a belt drive according to the present invention, in a starting phase of an internal combustion engine. For the sake of simplicity, the internal combustion engine will be described hereinafter only in connection with those parts that are necessary for the understanding of the present invention. The internal combustion engine includes a crankshaft 1 and a starter generator 2 which have been integrated in the belt drive. The belt drive has a first pulley 3 which is mounted on the crankshaft 1 and a second pulley 4 which is mounted on a shaft, not shown, of the starter generator 2. A belt 5, such as a V-ribbed belt (FIG. 3) or a toothed belt (FIG. 4), is looped about both pulleys 3, 4. Thee belt drive is further provided with a tensioner 6 which includes two tensioning arms 7, 8 swingably mounted for pivoting about a common rotation axis 11. The tensioning arm 7 has one end for supporting a tensioning roller 9 and the tensioning arm 8 has one end for supporting a tensioning roller 10. While the rotation axis 11 is located within an area circumscribed by the belt 5, both tensioning rollers 9, 10 are disposed outside the belt 5.

Figure 5:
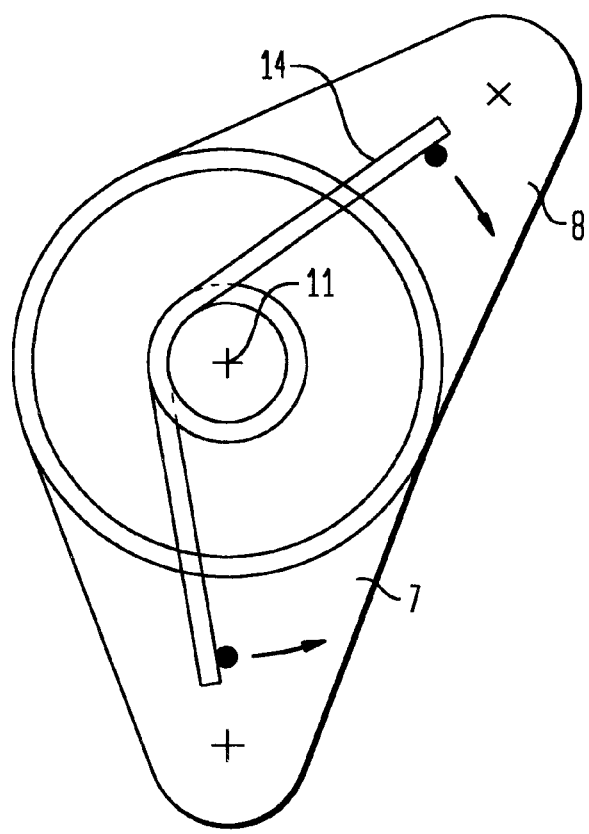
FIG. 5 is a schematic illustration of a tension spring acting between tensioning arms of a tensioner of the belt drive of FIG. 1.

Acting between both tensioning arms 7, 8 is a tension spring 14, which is shown in FIG. 5 and supported, on the one hand, by the tensioning arm 7, and on the other hand by the tensioning arm 8, for spring-loading the tensioning arms 7, 8 against the belt 5. Examples of tension springs, involved here, are described in U.S. Pat. No. 4,069,719, also in German Pat. No. DE 42 43 451 A1, to which reference is made herewith.

As shown in FIG. 1, the rotation axis 11 about which the tensioning arms 7, 8 pivot is spaced from the contact area of the tensioning roller 10 and 9, respectively, upon the belt 5 by a distance 11 which is smaller than a distance 12 between the rotation axis 11 and a tangent 12 which touches both surfaces of the pulleys 3, 4.

The starter generator 2 rotates clockwise as indicated by the arrow. During the starting phase shown in FIG. 1, the belt run which is loaded by the tensioning arm 8 becomes thus the load-carrying run. As a consequence, the resultant belt force W2 exceeds significantly the belt force W1 in the non-load carrying run which is loaded by the tensioning arm 7. As shown in FIG. 1, the effective line of the resultant belt force W2 at least approximately coincides with the symmetry line of the tensioning arm 8. This situation is characterized by the absence of a lever arm for the resultant belt force W2 to act on and to thereby further move the tensioning arm 8. Therefore, position of the tensioning arm 8 is stopped and the tensioning arm 8 is thereby held in place. In contrast thereto, the resultant belt force W1 in the non-loading belt run generates, as a result of the effective lever arm h, a torque, which counteracts the force of the tension spring. Hence, in the starting position of the internal combustion engine, as shown in FIG. 1, the tensioning roller 10 operates as a rigid deflection roller.

Figure 2:
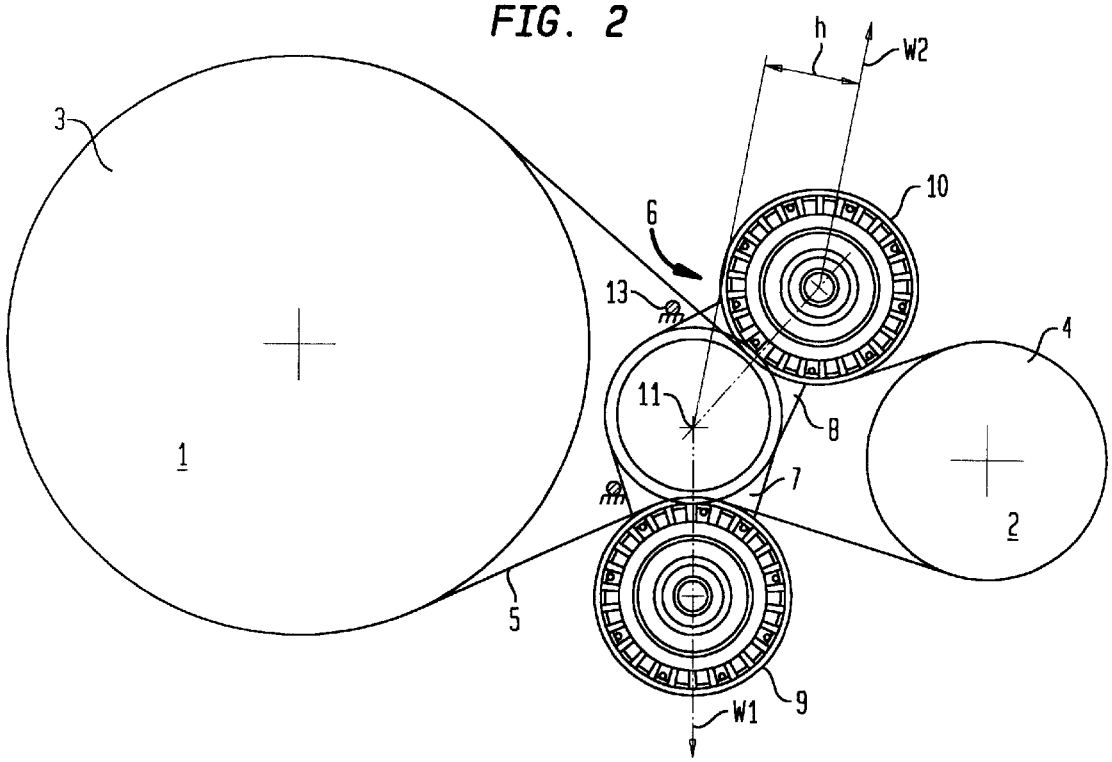
FIG. 2 is a schematic illustration of the belt drive during operation of the internal combustion engine.

FIG. 2 shows the situation during operation of the internal combustion engine, which means that the starter generator 2 produces electric current, with the crankshaft 1 acting as driving force. In this situation, the non-load carrying run and the load-carrying run have been switched, i.e. the load-carrying belt run in the starting phase now becomes the non-loading belt run, whereas the non-loading belt run in the starting phase now become the load-carrying belt run. Thus, no effective lever arm is available for the resultant belt force W1, whereas the resultant belt force W2 applies, in concert with the lever arm h, a torque which acts upon the tensioning arm 8 in opposition to the force applied by the tension spring. In this situation, the tensioning roller 9 now operates as a rigid deflection roller as the resultant belt force W1 coincides with the symmetry line of the tensioning arm 7.

The advantageous dead point position thus acts as a stop for the tensioning arms 7, 8. The described configuration of the length ratio of distance $I_1$ to distance $I_2$ enables a movement of the tensioning arms 7, 8 into the described dead point position.

Instead of the described dead point position of each of the tensioning arms 7, 8, it may also be conceivable to provide a respective fixed stop member 13, indicated schematically in FIGS. 1 and 2, against which the tensioning arm arranged upon the load-carrying belt run is urged by the resultant belt force and held there. This ensures that the tensioning roller operates also in this variation in the load-carrying belt run as a quasi-rigid deflection roller.

While the invention has been illustrated and described as embodied in a belt drive of an internal combustion engine, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A belt drive of an internal combustion engine, comprising:
   a first pulley mounted onto a crankshaft of the internal combustion engine;
   a second pulley mounted to a shaft of a starter generator of the internal combustion engine;
   a belt looped about the first and second pulleys; and
   a tensioner having two tensioning rollers and two tensioning arms, wherein the tensioning arms pivot about a common rotation axis, one of the tensioning arms supporting one of the tensioning rollers and applying a force upon one belt run of the belt so as to bias the one tensioning roller against the belt run, and the other one of the tensioning arms supporting the other one of the tensioning rollers and applying a force upon another belt run of the belt so as to bias the other tensioning roller against the belt run, and wherein the tensioning arm disposed in the belt run operating as the load-carrying run is urged by a resultant belt force into a stop position in which the resultant belt force extends, at least approximately, in alignment with the tensioning arm.

2. The belt drive of claim 1, wherein the rotation axis of each of the tensioning arms is spaced from a contact area of the tensioning rollers upon the belt by a first distance, and the rotation axis of each of the tensioning arms is spaced from a tangent, which touches the pulleys, by a second distance, wherein the first distance is smaller than the second distance, thereby establishing the stop position of the tensioning arms.

3. The belt drive of claim 1, and further comprising a fixed stop which the tensioner arm disposed in the belt run operating as the load-carrying run is urged against by the belt force.

4. The belt drive of claim 1, and further comprising a tension spring acting between the tensioning arms for urging the tensioning arms in a direction toward one another.

5. The belt drive of claim 1, wherein the belt is a member selected from the group consisting of toothed belt and V-ribbed belt.

6. The belt drive of claim 1, wherein the first and second rotation axes are positioned within an area circumscribed by the belt.

7. The belt drive of claim 1, wherein the tensioning rollers are located outside an area circumscribed by the belt.

\* \* \* \* \*